(12) United States Patent
Kruse

(10) Patent No.: US 12,284,308 B2
(45) Date of Patent: Apr. 22, 2025

(54) CELL PHONE STAND ASSEMBLY

(71) Applicant: Yvonne Kruse, Kalispell, MT (US)

(72) Inventor: Yvonne Kruse, Kalispell, MT (US)

( * ) Notice: Subject to any disclaimer, the term of this patent is extended or adjusted under 35 U.S.C. 154(b) by 443 days.

(21) Appl. No.: 18/046,480

(22) Filed: Oct. 13, 2022

(65) Prior Publication Data

US 2023/0111254 A1      Apr. 13, 2023

Related U.S. Application Data

(60) Provisional application No. 63/255,316, filed on Oct. 13, 2021.

(51) Int. Cl.
*H04M 1/04* (2006.01)

(52) U.S. Cl.
CPC ..................... *H04M 1/04* (2013.01)

(58) Field of Classification Search
CPC ........................................... H04M 1/04
USPC ....................................... 455/575.1
See application file for complete search history.

(56) References Cited

U.S. PATENT DOCUMENTS

| | | | | |
|---|---|---|---|---|
| 4,817,139 A * | 3/1989 | Russo | ................ | H04M 1/05 379/450 |
| 6,320,962 B1 * | 11/2001 | Eisenbraun | ......... | B60R 11/0241 379/454 |
| 6,662,986 B2 * | 12/2003 | Lehtonen | ............. | H04B 1/3888 224/675 |
| 8,973,795 B2 * | 3/2015 | Chiu, Jr. | ................ | A45F 5/00 224/250 |
| 9,538,675 B2 * | 1/2017 | Le Gette | ................ | F16M 11/10 |
| 10,279,241 B1 * | 5/2019 | Lurie | ................ | B62B 1/008 |
| 11,076,032 B1 * | 7/2021 | Carnevali | ................ | F16M 11/14 |
| 2005/0184117 A1 * | 8/2005 | Brown | ................ | A45F 3/14 224/623 |
| 2010/0107305 A1 * | 5/2010 | Krochmal | ................ | A42B 3/16 2/243.1 |
| 2013/0082471 A1 * | 4/2013 | Castorano | ............. | G06F 1/1656 294/25 |
| 2014/0232342 A1 * | 8/2014 | Turner | ................ | H02J 7/1415 320/114 |
| 2015/0201761 A1 * | 7/2015 | Wollenberg | ................ | A45F 4/02 224/160 |
| 2015/0305310 A1 * | 10/2015 | Roberdeaux | ......... | A01K 27/008 24/130 |
| 2016/0331105 A1 * | 11/2016 | Westbrook | ................ | A45F 5/021 |
| 2019/0246756 A1 * | 8/2019 | Mallory | ................ | A45C 11/00 |
| 2021/0348710 A1 * | 11/2021 | Daniels | ................ | F16M 11/105 |

(Continued)

FOREIGN PATENT DOCUMENTS

| | | | | |
|---|---|---|---|---|
| WO | WO-0124656 A1 * | 4/2001 | ............. | A45C 15/00 |
| WO | WO-2014050548 A1 * | 4/2014 | ........... | G06F 1/1632 |
| WO | WO-2019022419 A1 * | 1/2019 | ......... | B60R 11/0241 |

*Primary Examiner* — Mahendra R Patel

(74) *Attorney, Agent, or Firm* — Law Office of Jeff Williams PLLC; J. Oliver Oliver

(57) ABSTRACT

A stand assembly includes base and a set of legs. The legs are adjustable in location relative to the base. Further included is a strap configured to wrap around a portion of the base so as to hold a phone within the base. The base is formed to include a cradle to hold the phone in either a vertical or a horizontal orientation. A securing point is used in conjunction with the strap to secure the phone to the base. The legs may be flexed into any path so as to stabilize the base on any surface slope.

7 Claims, 6 Drawing Sheets

(56) References Cited

U.S. PATENT DOCUMENTS

| | | | |
|---|---|---|---|
| 2022/0133019 A1* | 5/2022 | Petralia | A45C 11/00 224/220 |
| 2022/0155042 A1* | 5/2022 | Considine | F41C 33/048 |

* cited by examiner

CELL PHONE STAND ASSEMBLY

CROSS REFERENCE TO RELATED APPLICATIONS

This application claims the benefit of an earlier filing date and right of priority to U.S. Provisional Application No. 63/255,316, filed 13 Oct. 2021, the contents of which is incorporated by reference herein in its entirety.

BACKGROUND OF THE INVENTION

1. Field of the Invention

The present application relates to a cell phone holder, and more particularly to an adjustable stand for holding a cell phone.

2. Description of Related Art

Various cell phones are in use today. Each comes in different sizes and shapes. Holders for cell phones exist and are typically a single formed stand that includes a set of legs. These legs are sized and located to hold the cell phone in an elevated orientation for viewing. Not all holders can hold a phone in a vertical orientation and a horizontal orientation as the center of gravity of the phone changes depending on its orientation. Not all surfaces are always horizontal or level. Customary stands find it difficult to adapt to varying surfaces and phones. Although strides have been made, shortcomings remain. It is desired that an assembly be provided that is adjustable for holding a phone in both orientations and can adapt to various surface contours. Although strides have been made, shortcomings remain.

BRIEF SUMMARY OF THE INVENTION

It is an object of the present application to provide a stand assembly for a cell phone configured to orient the cell phone in both a relative vertical and horizontal orientation for convenience of viewing. Additionally, the stand assembly of the present application is designed to selectively incorporate one or more straps to assist is stability of the cell phone in the stand assembly. Another object of the present application is to provide adjustable legs that may be selectively used to stabilize the stand assembly and cell phone on uneven surfaces.

Ultimately the invention may take many embodiments. In these ways, the present invention overcomes the disadvantages inherent in the prior art. The more important features have thus been outlined in order that the more detailed description that follows may be better understood and to ensure that the present contribution to the art is appreciated. Additional features will be described hereinafter and will form the subject matter of the claims that follow.

Many objects of the present application will appear from the following description and appended claims, reference being made to the accompanying drawings forming a part of this specification wherein like reference characters designate corresponding parts in the several views.

Before explaining at least one embodiment of the present invention in detail, it is to be understood that the embodiments are not limited in its application to the details of construction and the arrangements of the components set forth in the following description or illustrated in the drawings. The embodiments are capable of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the various purposes of the present design. It is important, therefore, that the claims be regarded as including such equivalent constructions insofar as they do not depart from the spirit and scope of the present application.

BRIEF DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
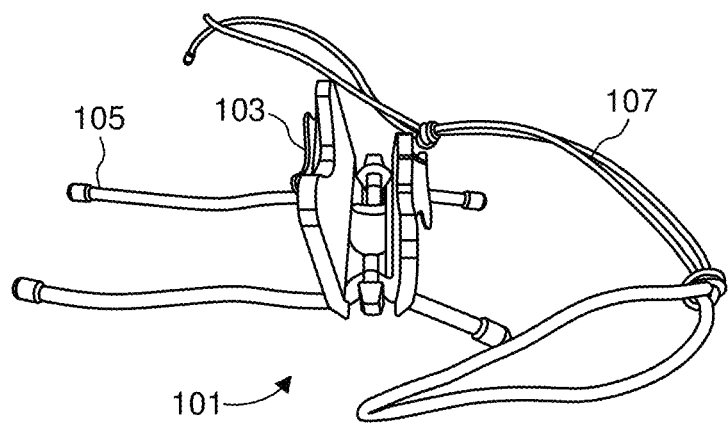
FIG. 1 is a perspective view of a stand assembly according to an embodiment of the present application.

While the embodiments and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE INVENTION

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the embodiments described herein may be oriented in any desired direction.

The embodiments and method in accordance with the present application overcomes one or more of the above-discussed problems commonly associated with the prior art discussed previously. In particular, the cell phone holder is configured to include a base with attachable legs for the purpose These and other unique features are discussed below and illustrated in the accompanying drawings.

The embodiments and method will be understood, both as to its structure and operation, from the accompanying drawings, taken in conjunction with the accompanying description. Several embodiments of the assembly may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

Referring now to the Figures wherein like reference characters identify corresponding or similar elements in form and function throughout the several views. The following Figures describe embodiments of the present application and its associated features. With reference now to the Figures, embodiments of the present application are herein described. It should be noted that the articles "a", "an", and "the", as used in this specification, include plural referents unless the content clearly dictates otherwise.

The stand assembly of the present application is configured to hold a cell phone at different preferred viewing orientations, namely horizontal and/or vertical, and is adapted to adjust to various surface contours to enable the phone to be elevated in the desired orientation for viewing. The is primarily done through a base and a plurality of adjustable legs as seen in the Figures.

Figure 2:
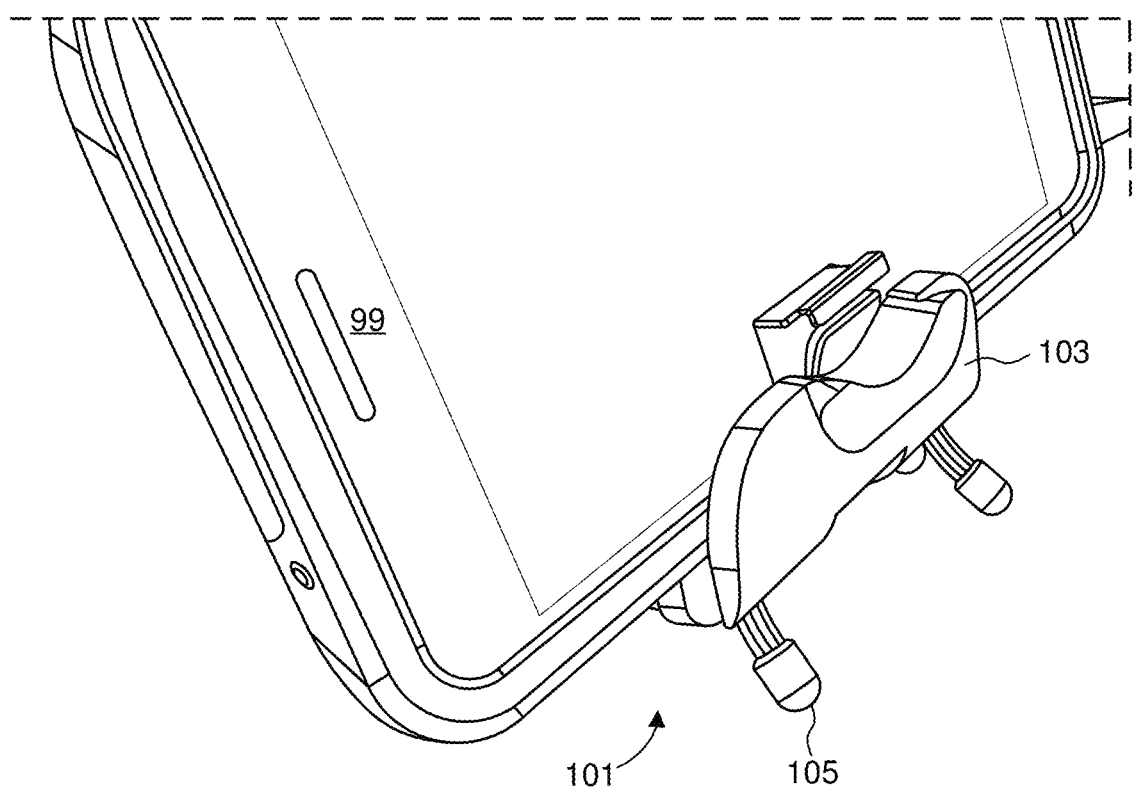
FIG. 2 is a perspective view of the stand assembly of FIG. 1 with a cell phone oriented horizontally.
Figure 3:
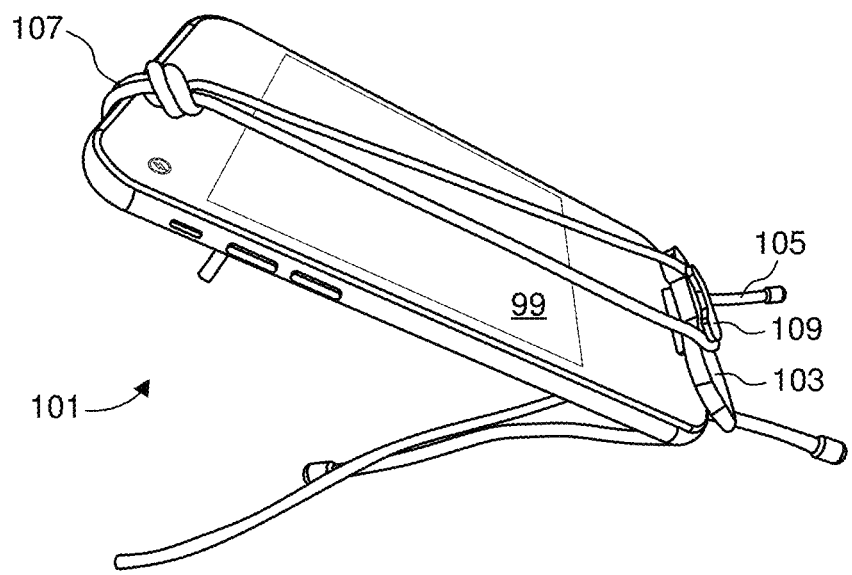
FIG. 3 is a perspective view of the stand assembly of FIG. 1 with a cell phone oriented vertically.

Referring now to FIGS. 1-3 in the drawings, a stand assembly 101 is shown. In FIG. 1 stand assembly 101 is shown without a phone 99. FIGS. 2 and 3 illustrate stand assembly 101 in use with phone 99. Stand assembly 101 includes base 103 and a set of legs 105. Also included is strap 107 configured to wrap around a portion of base 103 and phone 99. Strap 107 is configured to wrap around portions of phone 99 and base 103 so as to secure phone 99 to base 103. This is especially important wherein the orientation of the phone 99 is more heavily leaning with respect to the plane of the legs 105 as seen more in FIG. 3.

The center of gravity of phone 99 is located in different positions relative to base 103 depending on the orientation of phone 99. As such, the use of strap 107 may be more suited for use in one orientation over the other. As seen in FIG. 3, phone 99 is in a vertical orientation which presents a larger lean rearward since the center of gravity of phone 99 is farther back. In the horizontal orientation of FIG. 2, the center of gravity is located closer to base 103 and therefore the need of straps 107 may possibly be minimized so as to be more likely optional. It is understood that strap 107 is not required but is optional and may add stability to the whole assembly and phone 99 in various positions.

Figure 4:
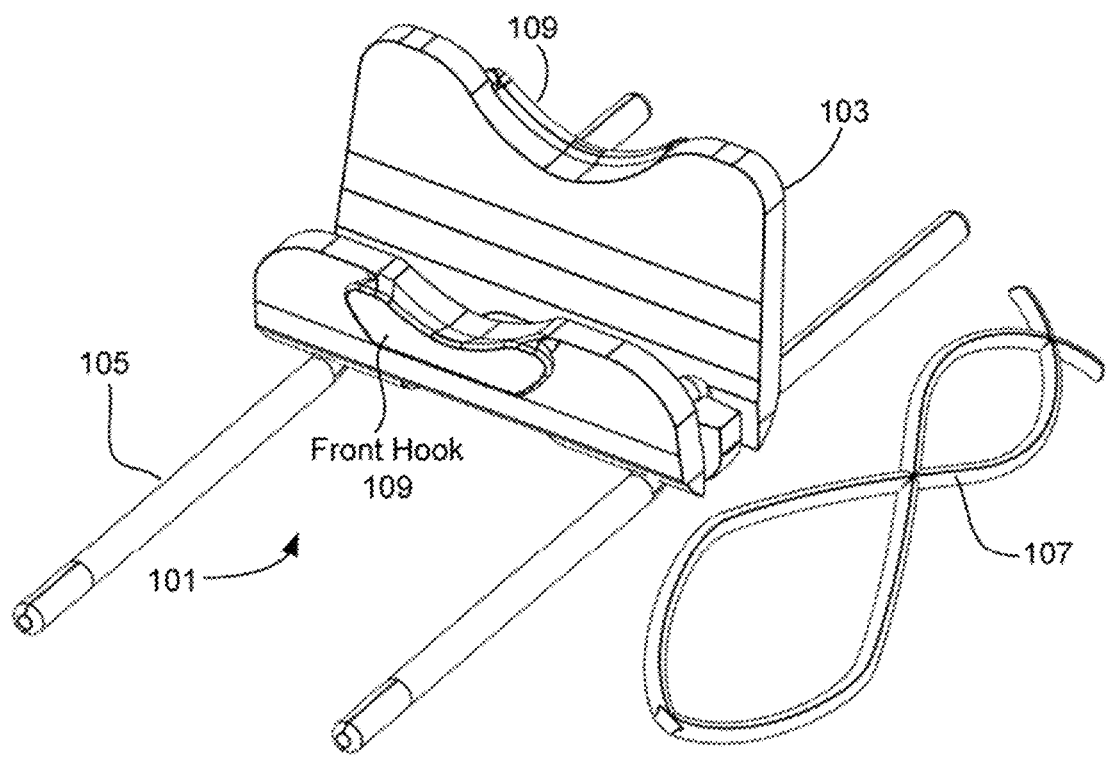
FIG. 4 is a representative perspective view of the stand assembly of FIG. 1.

Referring now to FIGS. 4-7 in the drawings, representative views of assembly 101 are provided. FIG. 4 is a perspective view wherein legs 105 are strait and extending from beneath base 103. Legs 105 are selectively coupled to base 103 in a manner that allows a user to remove or adjust its position relative to base 103. For example, a user may elect to remove one or both of the legs 105 from base 103. In another example, one or both legs 105 may be translated relative to base 103 to allow an end of a leg 105 to be moved closer or farther from base 103. The leg 105 may be coupled to base 103 in a manner such that a desired leg length extends away from base 103 to any side of the base 103. This translating feature allows a user to have greater control over stabilizing the base 103 and phone 99 unit when on sloped terrain/surfaces. It is further understood that legs 105 may be flexible to allow the user to selectively bend the legs 105 to a particular path.

Strap 107 is included to secure phone 99 to base 103 and noted above. It should be noted that strap 107 is shown as being detached from base 103 and not held in a coupled agreement therewith so as to be tethered to base 103. Strap 107 is flexible and may exhibit stretchable properties (i.e. elastic) to allow a compressive pressure over phone 99 and/or base 103. Strap 107 may be similar in form and function to that of a cord.

Figure 5:
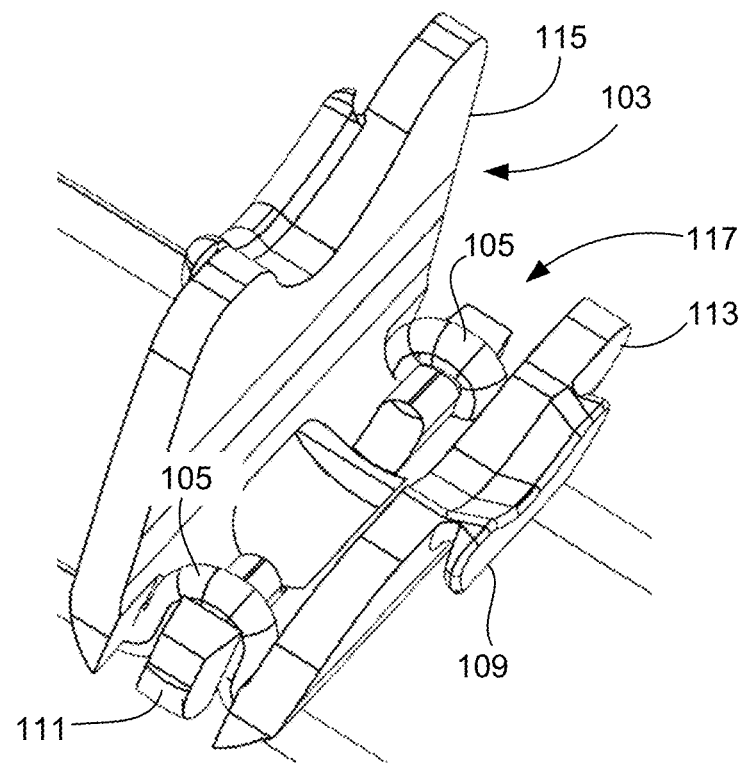
FIG. 5 is an enlarged perspective view of a base in the stand assembly of FIG. 1.
Figure 6:
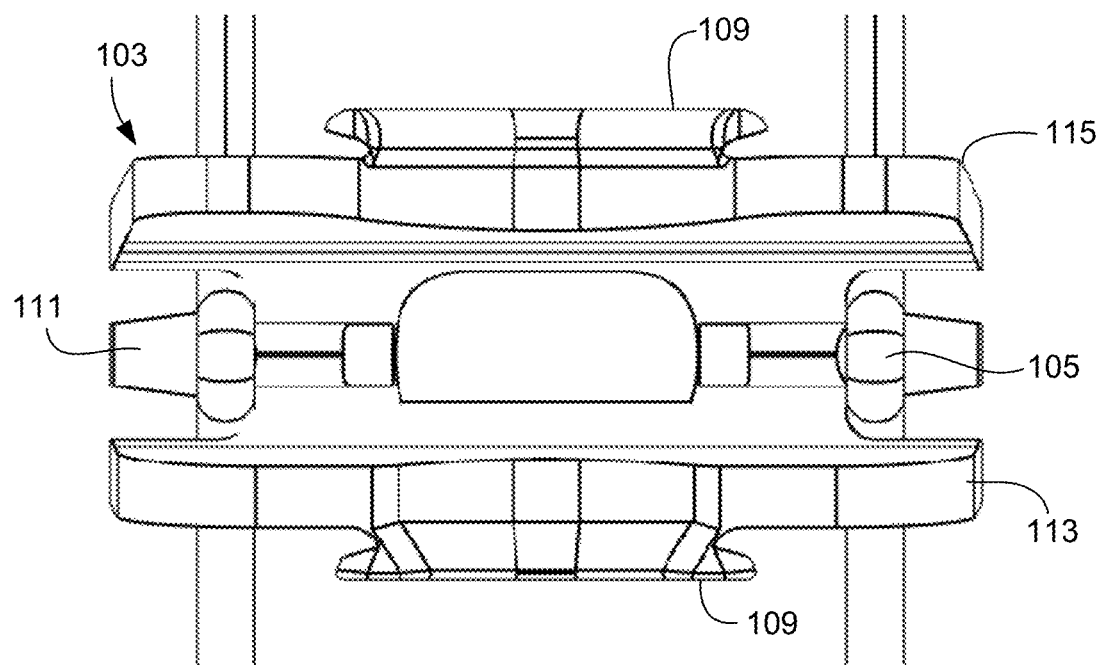
FIG. 6 is a top view of the base of FIG. 5.
Figure 7:
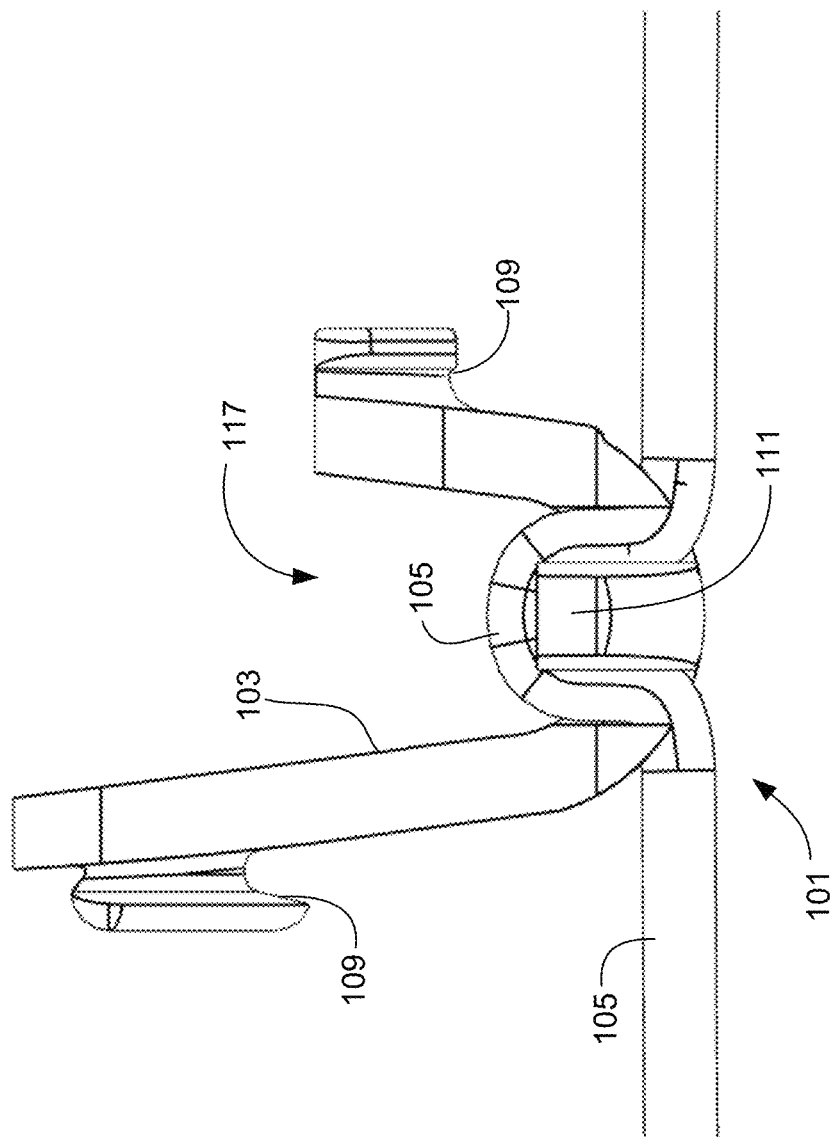
FIG. 7 is a side view of the base of FIG. 5.

As seen in FIGS. 5 and 6 legs 105 loop around a tab 111 located in a lower central portion of base 103. Base 103 includes lower tabs 111 to accept legs 105. Use of the tabs permits legs 105 to be secured to base 103 while maintaining the ability to remove and/or replace them at a future time. It is understood that the depicted and described form and function of legs 105 in association with base 103 is only one of many methods of permitting a releasable function between legs 105 and base 103.

Strap 107 is configured to selectively engage body 103 as a way to assist in securing phone 99 to base 103. Base 103 includes a cradle 117 centrally located between two upward raised flanges, namely a front flange 113 and a rear flange 115. On each of the exterior surfaces of the flanges 113/115 is a securing point 109 which may be used by strap 107 to loop under and then wrap over phone 99. This can be seen clearly in FIG. 3. Strap 107 is looped under a front securing point 109. The precise shape and contour of securing points 109 are not limited to those depicted. Securing points 109 are incorporated into body 103 to allow for the selective attaching or wrapping of strap 107. The securing points are configured primarily to extend from base 103 in a manner that allows strap 107 to hold an upward force when pulled around phone 99.

In some embodiments, strap 107 is preferably made from a stretchable material to permit some elasticity to enable simpler attachment around phone 99. Securing points 109 may be internally within a portion of the central channel or may be even an aperture to be threaded through. Any embodiment that permits straps 107 to couple to base 103 is permitted. Straps 107 may be formed to have a "figure 8"

appearance as seen in FIG. 4, however, other forms are possible. Straps 107 may have loose ends or be formed in other shapes.

It should be noted that phone 99 may be oriented vertically or horizontally. Legs 105 may be flexible to enable any viewing angle. The figures are clear to show strait legs 105 and curved legs 105. A user merely adjusts the legs to suit the present needs.

Figure 8:
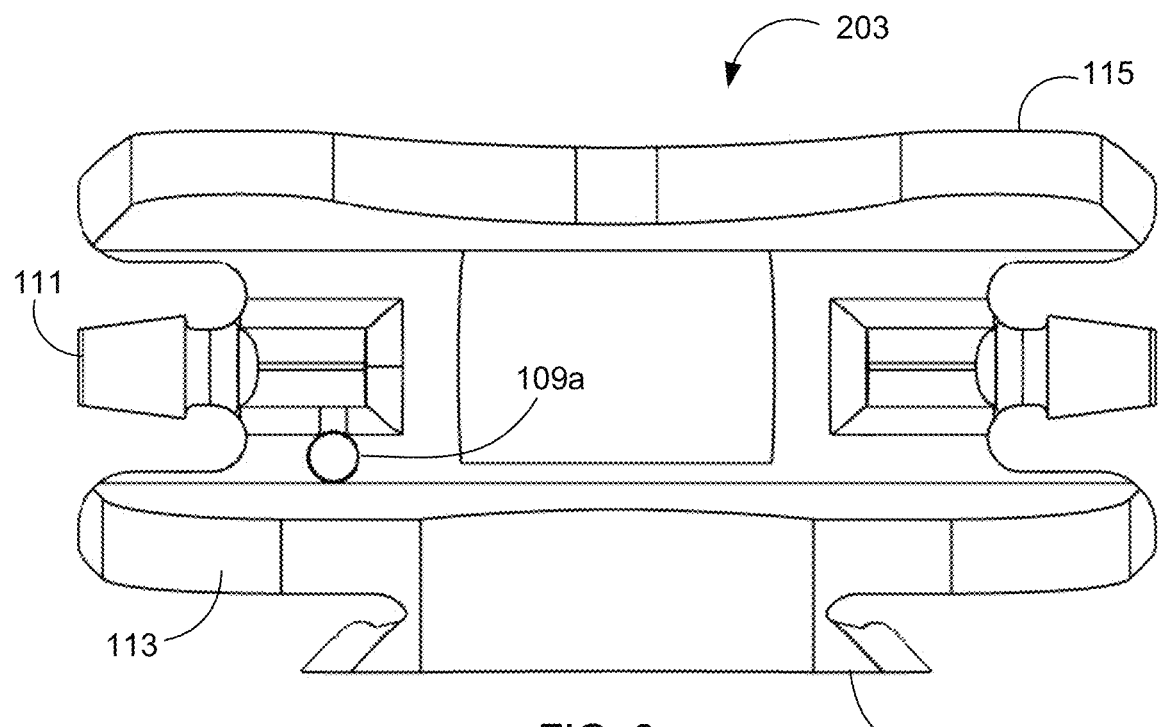
FIG. 8 is a top view of an alternate form of the base of the stand assembly of FIG. 1.
Figure 9:
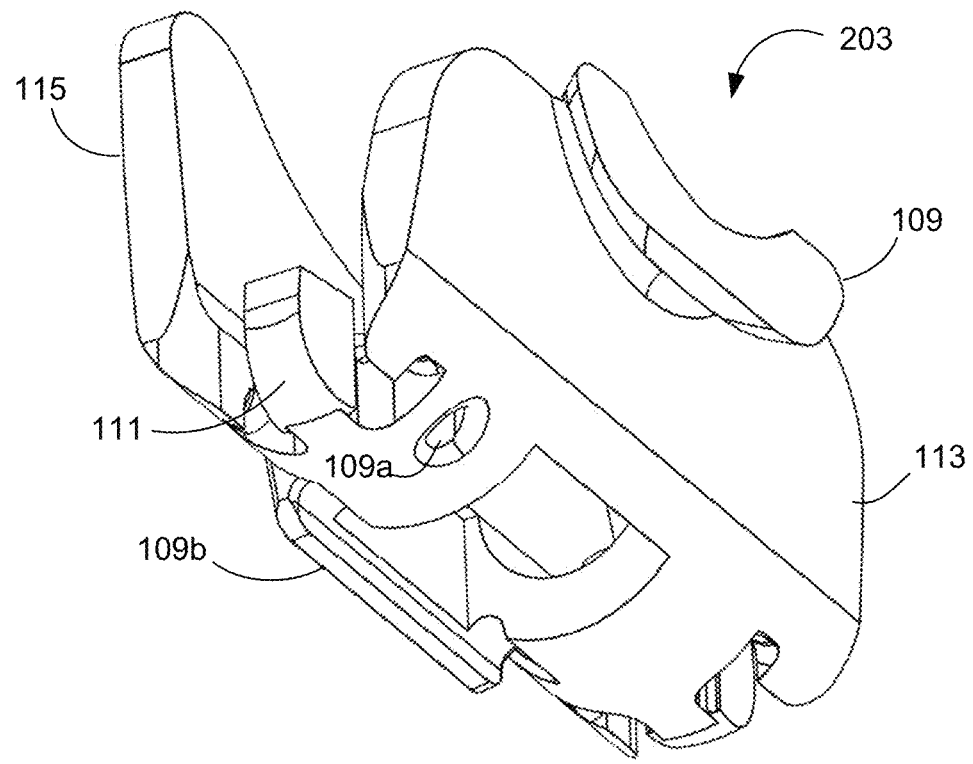
FIG. 9 is a lower perspective view of the base of FIG. 8.
Figure 10:
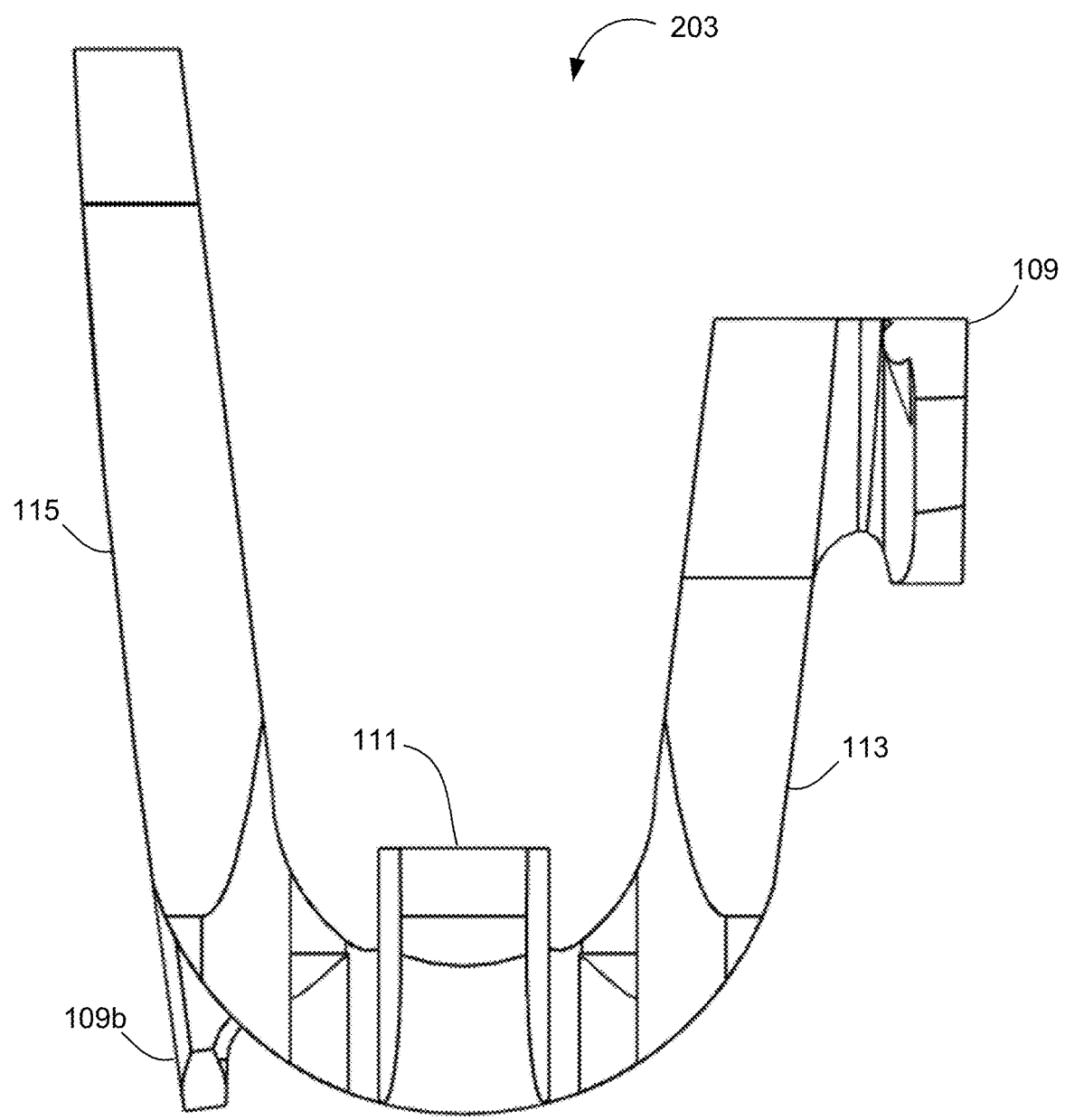
FIG. 10 is a side view of the base of FIG. 8.

Referring now also to FIGS. 8-10 in the drawings, an alternate form of base 103 is shown. Base 203 is similar in form and function to that of base 103 except as herein identified. Base 203 is configured to illustrate different possible locations of securing point 109. As noted previously, securing point 109 may be that of an aperture 109a for the passage of strap 107. Additionally, securing point 109b may be located in a different location on the base than at an upper portion of the flanges. As seen in FIGS. 8 and 9, base 203 includes securing point 109b which is an extended member of base 203 that extends below rear flange 115 but not beyond the lower surface of base 203.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated.

Although the present application is shown in a limited number of forms, it is not limited to just these forms, but is amenable to various changes and modifications without departing from the spirit thereof.

What is claimed is:

1. A stand assembly for a cell phone, comprising:
   a base having a front flange and a rear flange coupled along an end defining a cradle therebetween;
   a pair of tabs coupled to the base between the front flange and the rear flange;
   a pair of flexible legs configured to couple around a portion of the pair of tabs, the pair of legs are selectively coupled to the base so as to set a desired leg length extending from the base;
   a strap; and
   a securing point in the base for attachment of the strap.

2. The assembly of claim 1, wherein the securing point extends from at least one of the front flange and the rear flange.

3. The assembly of claim 1, wherein the securing point extends along an exterior surface.

4. The assembly of claim 1, wherein the securing point extends along an interior surface of the base.

5. The assembly of claim 1, wherein the securing point is an aperture in the base.

6. The assembly of claim 1, wherein the securing point extends below the rear flange.

7. The assembly of claim 1, wherein the cell phone is held in place within the cradle by the strap.

* * * * *